United States Patent [19]

Kotani et al.

[11] Patent Number: 4,954,391
[45] Date of Patent: Sep. 4, 1990

[54] HIGH DENSITY POLYETHYLENE TYPE TRANSPARENT FILM AND PROCESS FOR PRODUCTION THEREOF

[75] Inventors: Terumitsu Kotani, Kawasaki; Toshio Taka, Fujisawa; Yoshimasa Saito, Kawasaki, all of Japan

[73] Assignee: Showa Denko Kabushiki Kaisha, Tokyo, Japan

[21] Appl. No.: 80,514

[22] PCT Filed: Nov. 7, 1986

[86] PCT No.: PCT/JP86/00566

§ 371 Date: Jul. 7, 1987

§ 102(e) Date: Jul. 7, 1987

[87] PCT Pub. No.: WO87/02933

PCT Pub. Date: May 21, 1987

[30] Foreign Application Priority Data

Nov. 7, 1985 [JP] Japan .................. 60-248079
Nov. 25, 1985 [JP] Japan .................. 60-262672
Nov. 25, 1985 [JP] Japan .................. 60-262673
Jun. 3, 1986 [JP] Japan .................. 61-127206

[51] Int. Cl.$^5$ ............................................. C08L 23/04
[52] U.S. Cl. ............................ 428/220; 428/409; 525/240; 264/564
[58] Field of Search ........... 428/220, 409; 264/564; 525/240

[56] References Cited

U.S. PATENT DOCUMENTS 3,503,843 3/1970 Williams et al. .
3,998,914 12/1976 Lillis et al. .................. 525/240
4,623,581 11/1986 Hert ........................... 428/220
4,636,340 1/1987 Itaba et al. .
4,680,157 7/1987 Fujii et al. .................. 264/180

FOREIGN PATENT DOCUMENTS 1192333 8/1985 Canada .
0048227 3/1982 European Pat. Off. .
0057891 8/1982 European Pat. Off. .
0059242 4/1983 Japan ...................... 525/240

OTHER PUBLICATIONS

Journal of Polymer Science, vol. 20, No. 94, Apr., 1956, pp. 209–211, New York; J. J. Keane et al.: "Light Scattering from Oriented Polyethylene Films".
O. J. Sweeting: "The Science and Technology of Polymer Films", vol. 2, 1971, pp. 152–155, Chapter 2, Wiley, New York; O. J. Sweeting: "Polyethylene".
Chemical Abstracts, vol. 91, No. 24, 12/10/79, p. 13, Abstracts No. 193826j; A. Yoshino et al.: "Formation of Oriented-Extended-Chain Crystals on high-density Polyethylene and Their Transparency"; & Kobunshi Ronbunshu 1979, 36 (9), 581–7.

Primary Examiner—George F. Lesmes
Assistant Examiner—D. R. Zirker
Attorney, Agent, or Firm—Sughrue, Mion, Zinn, Macpeak & Seas

[57] ABSTRACT

A 10 to 200 μm thick film comprised of high density polyethylene having a density of 0.935 g/cm$^3$ or more, the high density polyethylene type film having a film surface roughness of 0.001 to 0.15 μm, a coefficient of C axis orientation of the cyrstals in the film (Fc) of 0.10 to 0.50, a difference Δn of the birefringence of the amorphous portions and crystalline portions in the film of 0.1000 to 0.1070, and a transparency of a haze of less than 10%. Such a film can be produced by passing an original material film through three heating rolls, designated as, for example, the first heating roll (hereinafter referred to as "$R_1$"), the second heating roll (hereinafter referred to as "$R_2$"), and the third heating roll (hereinafter referred to as "$R_3$"), in accordance with the order of the passage of the original material film, at a temperature of $R_2$ higher than the temperatures of $R_1$ and $R_3$ and a temperature of $R_2$ of 105° C. or more below the melting point of the film, for heat treatment, then cooling the same.

The obtained high density polyethylene type film has a superior transparency, a good balance of strength in the M direction and T direction, a remarkably large impact strength, and a large Young's modulus, and thus is suitable for use as a packing film for boxes for cigarettes, caramels, chocolates, etc., chewing gum, candy, and other confectionery.

14 Claims, No Drawings

HIGH DENSITY POLYETHYLENE TYPE TRANSPARENT FILM AND PROCESS FOR PRODUCTION THEREOF

TECHNICAL FIELD

The present invention relates to a high density polyethylene type film with a remarkably superior transparency and a process for production thereof, more particularly, it relates to a transparent high density polyethylene type film with a good balance of strength in the M (machine) direction and T (transverse) direction, a remarkably high impact strength of the film, and a large Young's modulus, and a process for production thereof.

The present invention further relates to a high density polyethylene type film having a high strength, superior transparency, and good heat sealability, and a process for production thereof.

BACKGROUND ART

In the past, to obtain a high density polyethylene (hereinafter referred to as "HDPE") transparent film, the general practice has been to pass a molten resin through a slit die and cool it rapidly by chill rolls or water. However, with this method, to improve the formability, use has been made of resins with low molecular weights. Therefore, the transparent film obtained has had a relatively weak strength.

To obtain a strong film through the use of high molecular weight HDPE in forming a film, the general practice has been to use air-cooled inflation. With this method, it has been possible to obtain a film with superior strength through balancing the molecular orientation with the blow ratio, but since air is used for the cooling, only translucent or semitransparent films have been obtainable.

Attempts have been made to achieve a certain degree of transparency (haze of about 15%) even with high molecular weight HDPE by passing the film through heated rolls having a surface gloss, so as to enhance the surface smoothness, but a transparency of a haze of 10% or less has not been obtained.

To make an HDPE film transparent, it is known to uniaxially draw a semitransparent HDPE film to a ratio of 5 to 10 and press it between rolls. The film obtained by this method does indeed have a superior transparency, but features a remarkable orientation in the drawing direction or rolling direction, and thus there is remarkable directionality in the aspect of film strength, resulting in a tendency to easy tearing, the obtaining of an insufficient strength, an uneven heat contraction, warping in the film, heat sealing inability, and other defects.

In the past, to obtain a high strength film from an HDPE film, the primary practice has been to use the inflation process. In inflation forming to obtain a high density film, as disclosed in Japanese Examined Patent Publication (Kokoku) No. 56-5172 and Japanese Unexamined Patent Publication (Kokai) No. 60-15122, it has been necessary to obtain a balance in the longitudinal and lateral orientation.

That is, if the orientation in the longitudinal direction is too great, longitudinal tearing easily occurs and if the orientation in the lateral direction is too great, a high strength film can not be obtained. Therefore, in general, in inflation forming, consideration is given to the ratio of the inflation ratio of the bubble and the diameter of the die, i.e., the blow ratio, the take up speed, and the frost line height. However, although it has been possible to impart strength to a film with a balance in the longitudinal and lateral orientations, in the case of a high density polyethylene, the transparency is poor, and thus the applications are limited at the present stage.

To improve the transparency of high density polyethylene type film, several other methods have been proposed.

For example, Japanese Unexamined Patent Publication (Kokai) No. 53-31768 proposes the technique of passing an original material thermoplastic resin film between a pair of rollers set to a clearance smaller than the thickness of the film and having a surface roughness of 0.5 s or less, at a temperature lower than the melting point or the softening point of the film, or lower, for rolling to obtain a film having a thickness smaller than the thickness of the original material film and a transparency of a haze of 4% or less. This technique is particularly characterized by the point of a maximum improvement of the surface state of the rolls used for the transparency treatment and, thereby, an improvement of the external haze, a factor governing the haze of film, to obtain a film with a superior transparency and gloss. However, by only defining the surface roughness of the rolls, improving the surface state of the rolls and, simultaneously, in this treatment, making the temperature lower than the melting point or the softening point of the film, or lower, and passing the film through the clearance between a pair of rolls, there are limits to the transparency of the HDPE film that can be obtained. In actuality, in this invention, examples relating to HDPE film were deleted from the embodiments in the subsequent examination process.

On the other hand, Japanese Unexamined Patent Publication (Kokai) No. 59-5032, proposes a technique for treating by pressure an HDPE inflation original film between smooth surfaces under a constant temperature to improve the optical characteristics of the obtained film. However, this technique, like the above-mentioned technique, obtains a film with improved optical characteristics through an improvement of only one of the factors governing the haze of the film, i.e., the external haze, as shown by the statement in the publication that it was discovered at that time that the extent of the haze of the film and the extent of the insufficiency of the transparency were primarily due to the surface characteristics of the film. In the publication, there is a description of treating under pressure the original film between two or more opposingly positioned rollers and heating it under a constant temperature so as to facilitate the plastic deformation of the film, but there is no specific disclosure of heat treatment by the rolls. The embodiments only make specific mention of a method for placing the original film between two smooth sheets and using the contact with the sheet surfaces to flatten the original film.

DISCLOSURE OF THE INVENTION

The object of the present invention IS TO eliminate these problems in the prior art and to provide a transparent HDPE type film which is highly transparent, has a good balance in the film M direction and T direction, has a large film impact strength, has a high Young's modulus, and has excellent heat sealability, and a process for the production thereof.

Other objects and novel features of the present invention will become clear from the disclosure of the overall description.

According to the present invention, there is provided a 10 to 200 μm thick film comprised of high density polyethylene having a density of 0.935 g/cm³ or more, this high density polyethylene type film having a film surface roughness of 0.001 to 0.15 μm, preferably 0.002 to 0.15 μm, more preferably 0.005 to 0.15 μm, a coefficient of C axis orientation of the crystals in the film (Fc) of 0.10 to 0.50, preferably 0.10 to 0.40, more preferably 0.10 to 0.30, a difference on of the birefringence of the amorphous portions and crystalline portions in the film of 0.1000 to 0.1070, preferably 0.1000 to 0.1065, more preferably 0.1005 to 0.1060, and a transparency of a haze of less than 10%, preferably less than 8%.

According to the present invention, there is further provided a 10 to 200 μm thick film comprised of 50% by weight or more of high density polyethylene having a density of 0.935 g/cm³ or more and high pressure low density polyethylene having a density of 0.910 to 0.930 g/cm³ or straight chain low density polyethylene having a density of 0.880 to 0.930 g/cm³, this high density polyethylene type film having a film surface roughness of 0.001 to 0.17 μm, preferably 0.001 to 0.15 μm, more preferably 0.010 to 0.15 μm, a coefficient of C axis orientation of the crystals in the film (Fc) of −0.3 to +0.50, preferably -0.2 to 0.40, more preferably −0.2 to 0.30, a difference Δn of the birefringence of the amorphous portions and crystalline portions in the film of 0.1000 to 0.1070, preferably 0.1000 to 0.1065, more preferably 0.1005 to 0.1060, and a transparency of a haze of less than 10%, preferably less than 8%. Note that the amount of the above-mentioned high pressure low density polyethylene or straight chain low density polyethylene is preferably 1 to 50 parts by weight, particularly suitably 1 to 30 parts by weight.

Below, an explanation will be made of the case of use of three of these heating rolls.

The present inventors engaged in in-depth studies of techniques for making a high density polyethylene transparent, whereupon they learned that, although it is necessary in the transparency treatment to pass the original material film between smooth surfaced rolls at a temperature under the melting point to obtain a thickness lower than the same, the transparency of the high density polyethylene is insufficiently improved by only passing the film through a pair of rolls at the same temperature, as in the prior art, and that by using three heating rolls, heating from the outside, providing the rolls with a temperature difference, and then rapidly cooling, a high density polyethylene can be obtained with a remarkably high transparency. It was learned that, according to the process, not only the roughness of the crystalline portions on the film surface, i.e., the external haze, but also the internal haze can be greatly reduced. Further, according to the present invention, and based on this discovery, there is provided a process for producing a high transparency high density polyethylene film having a haze of less than 10% characterized by passing an original material film comprised of a high density polyethylene having a density of 0.935 g/cm³ or more through three heating rolls under the below mentioned temperature conditions and then cooling the same. Note that, with regard to the temperature conditions of the above-mentioned heating rolls, designating the three rolls in the order of the passage of the original material film as the first heating roll (hereinafter referred to as "$R_1$"), the second heating roll (hereinafter referred to as "$R_2$"), and the third heating roll (hereinafter referred to as "$R_3$"), the temperature of $R_2$ is set higher than the temperatures of $R_1$ and $R_3$ and the temperature of $R_2$ is set at 105° C. or more but below the melting point of the film. In particular, it is preferable to pass the original material film formed by inflation forming by a blow ratio of 3 or more under the above-mentioned temperature conditions for a draw ratio of 3 or more.

In the high density polyethylene type film of the first aspect of the present invention, an attempt is made to eliminate the above-mentioned problem points by the formation of a film of at least 50% by weight of high density polyethylene having a density of 0.935 g/cm³, preferably 70% by weight or more, and a so-called high pressure low density polyethylene (hereinafter referred to as "LDPE") having a density of 0.910 g/cm³ to 0.930 g/cm³.

Further, in the high density polyethylene type film of the second aspect, an attempt is made to eliminate the above-mentioned problem points by forming a film from a composition comprised of at least 50% by weight of a high a density polyethylene having a density of 1 0.935 g/cm³, preferably 70% by weight or more, and a straight chain low density polyethylene copolymer (hereinafter referred to as "L-LDPE") having a density of 0.88 g/cm³ to 0.930 g/cm³, then heat treating the same by three or more heating rolls having a superior surface gloss.

The high density polyethylene constituting the original material high density polyethylene film in the present invention may be an ethylene homopolymer or a copolymer of ethylene and one type or two types or more of comonomers. As an example of the copolymer involved, mention may be made of ethylene/propylene, ethylene/butene-1, and ethylene/hexene-1 copolymers. Further, the high density polyethylene may be a blend with other polymers or may be a composition including antioxidants, dyes, inorganic fillers, and other additives. As examples of the other polymers to be blended therewith, mention may be made of low density polyethylene, polypropylene, copolymers of ethylene and vinyl acetate, and copolymers of ethylene and ethylene acrylate. At this time, the high density polyethylene is preferably included in an amount of at least 50%, preferably 70% or more.

The original material film is produced by the inflation process, T-die process, and various other film-forming processes. In particular, good results can be obtained by applying the process of production of the present invention to a high density polyethylene film produced by the inflation process, where transparency is a problem.

The density of the high density polyethylene is 0.935 g/cm³ or more, preferably 0.935 to 0.975 g/cm³, more preferably 0.945 to 0.960 g/cm³. With a density of less than 0.935 g/cm³, it is impossible to provide superior properties to the HDPE film, e.g., nerve strength (Young's modulus), barrier property (moisture proofness), impact strength. When applying the present invention to a relatively high molecular weight polyethylene type resin or resin composition having the above density and seeking a greater strength in a film including at least 50% of a high density polyethylene, more preferably 70 to 90%, the melt index of the high density polyethylene (according to JIS K-7210, measurement under condition 4, hereinafter referred to as "MFR") should be made 1.0 g/10 min or less, preferably 0.5 g/10 min or less, more preferably 0.1 g/10 min or less, particularly preferably 0.06 g/10 min or less. The original material film is formed by the inflation process.

The MFR of the LDPE and L-LDPE is usually 0.1 to 10.0 g/10 min, preferably 0.1 to 3.0 g/10 min, particularly preferably 0.1 to 2.0 g/10 min. If an LDPE or L-LDPE with an MFR of less than 0.1 g is used, the fluidity is poor and thus the below mentioned formability of the film is poor, making production of an excellent film difficult. On the other hand, if an LDPE or L-LDPE with an MFR of over 10.0 g/10 min is used, a film having an excellent strength cannot be obtained.

The blow ratio in the inflation molding is preferably 3 or more. When less than 3, the orientation in the lateral direction is small and the heat treatment of subsequent processes will result in an overly large orientation in the longitudinal direction, making it difficult to obtain a film with a sufficiently high strength.

As the L-LDPE which can be used in the production of the film of the present invention, use may be made of one comprised of ethylene and α-olefin. As the α-olefin, use is suitably made of one having 3 to 10 carbon atoms, for example, propylene, butene-1, hexene-1, octene, 4-methyl-pentene. Further, the L-LDPE used is one with a density of 0.88 g/cm$^3$ to 0.930 g/cm$^3$. Production of a straight chain low density PE copolymer having a density of less than 0.88 g/cm$^3$ is extremely difficult. Further, if the density of the straight chain low PE copolymer is over 0.930 g/cm$^3$, there is the inconvenience that the heat sealability cannot be improved.

The film of the present invention can be formed from the above-mentioned high density PE and L-LDPE, but of course, antioxidants, dyes, etc., may be added in accordance with need.

According to the film production process of the present invention, first, the above-mentioned high density PE or a composition comprised of L-LDPE or LDPE in the above-mentioned formulation proportion is formed into an original material film. As the method for forming the composition into a film, use may be made of the inflation process, T-die process, etc. When the above-mentioned composition is formed into a film by the inflation process, preferably the blow ratio is 3 or more. When the blow ratio is less than 3, the orientation in the lateral direction of the constituent molecules is insufficient and the orientation of the molecules in the longitudinal direction becomes too great due to the after-treatment accompanying the heat treatment, so there is the inconvenience that it is impossible to sufficiently improve the strength of the obtained film.

The "transparency" of the film in the present invention may be divided into the transparency of the film surface and interior. The transparency of HDPE film formed by the air-cooled inflation process (for example, one with a thickness of 40 μm [melt flow index (MI)=0.04 g/10 min, density (D)=0.949 g/cm$^3$] was measured in terms of the surface factors and internal factors, and as a result, a total haze of the film (hereinafter also referred to as simply the "have") was, for example, 75%, which could be divided into a surface haze of 60% and an internal haze of 15%. In particular, the surface haze is derived from the scattering of light due to the roughness of the fine structure caused by crystallization of the film surface layer. Physical smoothing of the surface is possible in the present invention by making the surface roughness of the film 0.1 μm or less, whereby a remarkable improvement is achieved. The principle is the same, for example, as with making ground glass (translucent) transparent by applying cellophane tape to its two sides. As an example of application, there is known the method of applying to the two sides of an HDPE film a resin with a good transparency, or extruding the same. However, as mentioned earlier, this method only reduces the scattering on the surface of the film, and with this along, sufficient transparency cannot be obtained.

Therefore, unless the internal haze is eliminated, it is impossible to obtain a film with a superior transparency of haze of 15% or less in the above-mentioned case.

Therefore, the present inventors engaged in thoroughgoing research into the factors causing the internal haze and considered that the factors of the internal haze were the sum of the fluctuation in the orientation of the crystal lattice axes (birefringence of a, b, and c axes of polyethylene) and the fluctuation in the birefringence arising from the difference Δn of the birefringence of the amorphous layer (portion) and crystalline layer (portion). They found the orientation of the crystal lattice axes from the coefficient of orientation Fc and Δn from Lorenz-Lorentz's formula and studied the coefficient of transparency of the film from various data, and as a result, they discovered that Fc and Δn have a close relationship with the transparency inside the film.

That is, the greater the Fc (the more uniform the c axis orientation) and the smaller the Δn, the better the transparency inside the film.

As a result, they discovered that, with a film thickness of 200 μm or less, when Fc is 0.1 or more and Δn is 0.1070 or less, the transparency of an HDPE film with a smooth surface having a surface roughness of 0.1 μm or less is remarkably improved, and thus completed the present invention.

Here, the coefficient of orientation of the c axis Fc is found by the Stein method from the polarization infrared spectrum (Macromolecule 1, 116, 1968):

$$Fa = (D730^{-1})/(D730 + Z)$$

$$Fb = (D720^{-1})/(D720 + Z)$$

$$Fa + Fb + Fc = 0$$

where, D730 and D720 are the infrared dichromatic ratios at 730 cm$^{-1}$ and 720 cm$^{-1}$ and Fa, Fb, and Fc are the coefficients of orientation of the a, b, and c axis of the crystals. Further, the difference Δn of the birefringence of the crystal and amorphous portions is obtained from a modified Lorenz-Lorentz formula (Plastics, vol. 31, no. 2, p. 34)

$$\frac{\Delta n}{n} = \frac{(n^2 - 1) \times (n^2 + 2)}{6n} \cdot \frac{\Delta \rho}{\rho}$$

wherein, nD is the birefringence of the film and is measured by an Atsube type birefringence meter, ρ is the film density and is found by a density gradient tube, and Δρ is the difference in the density of the crystalline and amorphous portions. The values of the follow references were used.

Crystalline density: 1.01 g/cm$^3$, E. R. Walter, J. Polymer Sci 21, 561[c19]

Amorphous density: 0.85 g/cm$^3$, A. K. Doolittle: J. App. Phys. 22, 1471[c19] The have measurement was in accordance with ASTM-D-1003.

Further, the surface roughness, which indicates the smoothness of the film surface, was measured in accordance with the test method of JIS B0601-55.

The resin in the present invention is designated as being a thermoplastic resin including at least 50% of HDPE having a density of 0.935 g/cm$^3$ or more, preferably 70% or more, in that the superior characteristics of an HDPE film, e.g., nerve strength (Young's modulus), barrier property (moisture proofness), impact strength, etc., are available with a density of 0.935 g/cm$^3$ and further in that these characteristics can be secured even when blending in various additives or molecular weight increasers to modify the resin or blending resins, by including at least 70% of the above-mentioned HDPE.

Further, in the present invention, the film surface roughness is made 0.1 μm or less because there is great external roughness in the case of HDPE, which scatters light at the surface, and this is a factor behind the greater external haze. This is one of the conditions for elimination of this roughness and creation of the highly transparent film desired in the present invention.

For the heating rolls, for example, use is made of metal rolls having a hard chrome plating on the surfaces thereof. These may be polished.

Further, it is possible to use rolls having smooth surfaces which are worked or finished to a mirror-like gloss.

Among the heating rolls, the temperature of the second roll ($R_2$) must be made higher than that of the first roll ($R_1$) and third roll ($R_3$) That is, the original material film should be passed through heating rolls comprised of a system of $R_1$, $R_2$, and $R_3$ with the intermediate roll set to the highest temperature and a temperature difference given among the rolls.

The temperature of $R_1$ is preferably 50° C. or more, 55° C. being particularly preferable.

The temperature of the above-mentioned $R_2$ must be 105° C. or more but below the melting point of the original material film. Therefore, the heating rolls are all set to below the melting point of the original material film, but it is necessary to provide a temperature difference between $R_2$ and the other rolls, i.e., $R_1$ and $R_3$. The temperature of $R_1$ and $R_3$ should be set to a temperature not higher than the temperature of $R_2$.

The temperature of $R_3$ is preferably 70° C. or more, 75° C. or more being particularly preferable. If the temperature of $R_3$ is over 120° C., an excellent transparency is difficult to obtain. Further, at less than 70° C., the film will adhere to $R_2$ and a sufficient transparency would be difficult to obtain.

In a preferred embodiment of the present invention, $R_2$ is heated externally by an infrared heater, etc. The heating temperature is a temperature higher than 80° C., but a temperature lower than the temperature at which the high density polyethylene would melt. Therefore, 180° C. or less (suitably 160° C. or less) is preferable. The heating enables the acquisition of a film having sufficient uniform transparency even with an original material thinner than 50 μm and a draw ratio of 1 to 3. By way of reference, if the original material film is thinner than 50 μm, a film having a uniform transparency cannot be obtained without external heating. At this time, the heating is preferably applied uniformly to the surface which comes in contact with the roll in a manner such that the above-mentioned temperature range is achieved.

The original material film may be passed through the clearance of the above-mentioned three heating rolls, which is less than the thickness of the original material film, to obtain a transparent film having a thickness less than that of the original material film.

The draw ratio is made 3 or less. If drawing is greater than 3, the orientation in the longitudinal direction would progress too far and a film with a sufficient high strength could not be obtained. The preferable draw ratio or compression ratio is larger than 1 and no more than 3.

The film which has passed through the heating rolls is then cooled. For example, it is cooled by two chill rolls (hereafter referred to as $R_4$ and $R_5$). The temperature of the chill rolls is not particularly critical, but is preferably not more than 70° C. and not less than 30° C. If over 70° C. the chill rolls would not be able to perform their function. If less than 30° C., it would be difficult to secure a sufficient flatness of the film.

The thickness of the original material film used in the present invention is not particularly limited and is decided by the desired thickness of the product, etc. This is thicker than the thickness of the finished film, but less than 3 times the film thickness, preferably 2.3 times or less, more preferably 1.05 to 1.8 times the film thickness.

According to the present invention, a high transparent high density polyethylene having a haze less than 10% is obtained. The haze is measured according to ASTM D-1003. The haze in the present invention refers to the sum of the external haze and the internal haze.

The high density polyethylene film crystallizes at the surface in the free surface state after film formation by the inflation process, and lamera aggregates (l=100 to 110 Å) protrude as roughness from the surface. The magnitude of the same corresponds to the wavelength (4000 to 8000 Å) of visible light, so scattering occurs and the film becomes nontransparent.

Due to the transparency treatment of the present invention, the surface roughness is smoothed in a state of easy movement of molecular chains, the wavelength of the roughness is 4000 Å or less, and the external haze is made excellent. The present invention has the important feature of enabling a reduction of not only the external haze, but also the internal haze. As factors of nontransparency from inside films, there are considered the nonuniform thickness of microcrystals and the internal voids included in the crystals.

In the present invention, due to the transparency treatment, for example, a density of of a film before treatment of 0.948 g/cm$^3$ is raised to a density of a film after treatment of 0.952 g/cm$^3$, and it is considered that the above-mentioned internal voids and nonuniform layer are eliminated.

EXAMPLES

The present invention will now be explained by the following Examples and Comparative Examples.

Examples 1 to 3 and Comparative Examples 1 to 4

In the Examples and Comparative Examples, HDPE (D =0.949 g/cm$^3$, MI =0.04 g/10 min) was subjected to the inflation process to produce an original material film 50 μm in thickness. The original material film was passed through heating rolls having a surface gloss (temperature below melting point of resin) to produce a film with a surface roughness of 0.1 μm or less and different Fc's and Δn's. The physical properties of the films are shown in Table 1.

However, in Example 3 and Comparative Example 4, use was made of a blend of HDPE and low density polyethylene (LDPE, D=0.921, MI=1.5). Otherwise, the procedures were the same as above.
(1) Forming material: 65φ Ext, die: 100φ spiral
(2) Temperature $C_1=C_2=C_3=H=D=190°$ C.
(3) Take up speed: 15 m/min
(4) Blow ratio (BVR)=4.0
(5) Film thickness: 50 μm

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Resin used | HDPE | HDPE | HDPE (80%) LDPE (20%) | HDPE (80%) L-LDPE (20%) | HDPE | HDPE | HDPE | HDPE (60%) LDPE (40%) |
| Fc | 0.201 | 0.315 | 0.150 | 0.160 | 0.023 | 0.023 | 0.195 | 0.050 |
| Δn | 0.1057 | 0.1048 | 0.1035 | 0.1040 | 0.1075 | 0.1063 | 0.1077 | 0.1060 |
| Film properties | | | | | | | | |
| Haze (%) | 9.5 | 3.5 | 4.2 | −3.8 | 28 | 23 | 19 | 15 |
| Impact (kg · cm/mm) | 280 | 250 | 20 | 285 | 260 | 290 | 250 | 180 |
| Young's modulus | 9,800 | 10,500 | 7,200 | 7,800 | 8,800 | 8,500 | 8,300 | 5,500 |
| Roughness (μm) | 0.108 | 0.075 | 0.090 | 0.085 | — | 0.205 | — | 0.175 |
|  | | | | | | (Film thickness 45 μm) | | |

L-LDPE = density 0.917 g/cm$^3$, MFR = 0.79 g/10 min, ethyl groups/100 C = 20 ethylene-butene-1 copolymer.

Example 4

Use was made of an HDPE having a melt index of 0.05 g/10 min and a density of 0.949 g/cm$^3$. Using the inflation process, a blow ratio of 5, a frost line of 500 mm, and a take up speed of 10 m/min, a 100 μm thick original material film was formed. This was drawn at a draw ratio of 3 and heat treated under the conditions shown in Table 1. Note that the chill roll temperatures were $R_4=R_5$:50° C.

Note that in the following examples, the breaking strength was determined according to JIS-Z-1702.

Examples 5 to 9 and Comparative Examples 5 to 7

High density polyethylene film was obtained in the same manner except for using the conditions shown in Table 2. The results are shown in Table 2.

Comparative Example 8

High density polyethylene film was obtained in the same manner as in Example 2, except that the blow ratio was made 2 and the conditions shown in Table 2 were used.
The results are shown in Table 2.

TABLE 2

|  | $R_1$ (°C.) | $R_2$ (°C.) | $R_3$ (°C.) | Haze (%) | Breaking strength (kg/cm$^2$) MD/TD | Thickness after treatment (μm) |
| --- | --- | --- | --- | --- | --- | --- |
| Ex. 4 | 70 | 128 | 85 | 5.5 | 445/415 | 82 |
| Ex. 5 | 105 | 128 | 105 | 5.2 | 475/398 | 67 |
| Ex. 6 | 105 | 120 | 105 | 5.6 | 460/408 | 73 |
| Ex. 7 | 60 | 120 | 85 | 8.8 | 453/438 | 87 |
| Ex. 8 | 110 | 120 | 85 | 7.1 | 488/385 | 68 |
| Ex. 9 | 70 | 121 | 85 | 7.3 | 461/418 | 84 |
| Com. Ex. 5 | 70 | 138 | 85 | Stuck on 2nd roll | | |
| Com. Ex. 6 | 70 | 125 | 130 | 58 | 453/395 | 72 |
| Com. Ex. 7 | 70 | 90 | 85 | 68 | 473/435 | 68 |
| Com. Ex. 8 | 70 | 125 | 105 | 6.3 | 553/223 | 65 |

Examples 10 to 12

High density polyethylene (density 0.950 g/cm$^3$, blow ratio 3) with an MFR of 0.05 g/10 min and a melting point of 130° C. was subjected to a usual inflation process to produce original materials having thicknesses of 20 μm, 30 μm, and 40 μm (hereinafter referred to as "original material (1)", "original material (2)", and "original material (3)"). These original materials (shown in Table 3) were used to produce films with thicknesses as shown in Table 4, using rolls with a superior surface gloss at an $R_1$ temperature of 85° C., an $R_2$ temperature of 115° C., an $R_3$ temperature of 110° C., and a chill roll $R_4$ and $R_5$ temperature of 50° C. The haze of the obtained films was measured, and the results are shown in Table 3. Note that $R_2$ was heated by an infrared heater.

TABLE 3

| Example | Orig. mat. type | Film Thickness (μm) | Haze value (%) |
| --- | --- | --- | --- |
| Ex. 10 | Orig. mat. (1) | 15 | 2.5 |
| Ex. 11 | Orig. mat. (2) | 21 | 2.8 |
| Ex. 12 | Orig. mat. (3) | 50 | 4.5 |
| Com. Ex. 9 | Orig. mat. (1) | 15 | — |
| Com. Ex. 10 | Orig. mat. (2) | 21 | — |
| Com. Ex. 11 | Orig. mat. (3) | 30 | — |

Note that the films obtained by Examples 10 to 12 were all uniformly transparent. Note further that Comparative Examples 9 to 11 did not make use of an infrared heater, but used heating rolls for the heating. In Comparative Examples 9 to 11, films having a uniform transparency could not be obtained.

Examples 13 to 14 and Comparative Examples 12 to 14

For the high density PE, use was made of one having a density of 0.950 g/cm$^3$ and a melt index of 0.04 g/10 min. For the straight chain low density PE copolymer, use was made of one with a density of 0.88 g/cm$^3$ and a melt index of 4 g/10 min.

The formulation ratio of high density PE and straight chain low density PE copolymer was 100/0 in Comparative Example 12, 95/5 in Comparative Example 13, 70/30 in Example 13, 60/40 in Example 14, and 40/60 in Comparative Example 14.

The compositions comprised of the above formulations were subjected to the inflation process to make films having thicknesses of 100 μm, which were used as the original material films. At this time, the forming temperature was 200° C. and the blow ratio 3.

The original material films produced as above were heat treated by the three heating rolls, and were then cooled by the two chill rolls to obtain films 70 μm in thickness. The temperatures of the heating rolls were set to 100° C. for the first roll ($R_1$), 115° C. for the second roll ($R_2$), and 100° C. for the third roll ($R_3$). Further, the temperature of the chill rolls was set to 30° C.

The physical properties of the films thus obtained are shown in Table 4.

TABLE 4

| | Haze value (%) | Yield strength (kg/cm$^2$) | Young's modulus (kg/cm$^2$) | Low temp. sealability (°C.) | Impact strength (kg · cm/mm) |
|---|---|---|---|---|---|
| Com. Ex. 12 | 6 | 2 | 10,500 | 135 | 188 |
| Com. Ex. 13 | 6.0 | 1.9 | 9,300 | 133 | 210 |
| Ex. 13 | 4.3 | 1.75 | 8,700 | 120 | 320 |
| Ex. 14 | 4.5 | 1.35 | 7,600 | 115 | 315 |
| Com. Ex. 14 | 4.8 | 0.98 | 5,100 | 105 | 285 |

The physical properties were determined by the following methods:

Haze . . . according to ASTM D1003
Yield strength . . . according to JIS Z1702
Young's modulus . . . according to ASTM D882
Heat sealability . . . First, the film was cut into narrow strips 15 mm wide. These were heat sealed under conditions of a sealing pressure of 2 kg/cm$^2$ and a sealing time of 1 second, with different temperatures, then the test pieces were peeled at a speed of 300 mm/min to determine the peeling strength. The heat sealability was expressed by the sealing temperature of test pieces displaying a peeling strength of 1 kg.
Impact strength . . . according to ASTM-D-781

From the results of Table 4, it was confirmed that the film of the present invention had superior impact strength and a good balance of such physical properties as the heat sealability, haze, yield strength, and Young's modulus.

EFFECTS OF THE INVENTION

According to the present invention, as indicated also by the above-mentioned embodiments, a high density polyethylene type film with a small haze and superior transparency is obtained. This film further has both transparency and film strength, so although conventional high density polyethylene films were considered difficult to make highly transparent without obstructing the film strength, this was realized in the present invention. Therefore, the industrial significance is great. The high density polyethylene type film of the present invention, having the constitution explained above, has flexability and a suitable melting temperature, so in addition to the superior characteristics of high density polyethylene, i.e., high strength and high transparency, it is provided with an excellent impact resistance and heat sealability. Therefore, the film of the first aspect of the invention can be easily heat sealed at a low temperature and is difficult to break even under impact. Further, according to the process of production of the present invention, it is possible to produce a film having not only a high strength, easy heat sealability, and high impact strength, but also an excellent transparency.

We claim:

1. A film having a thickness of 10 to 200 μm comprised of high density polyethylene having a density of 0.935 g/cm$^3$ or more and having an MFR of 0.1 g/10 min or less, said high density polyetheylene type film having a film surface roughness of 0.001 to 0.15 μm, a coefficient of C axis orientation of the crystals in the film (Fc) of 0.10 to 0.50, a difference Δn of the birefringence of the amorphous portions and crystalline portions in the form of 0.1000 to 0.1070, an impact strength of 250 kg·cm/mm or more and a transparency of a haze of less than 10%, said film being produced by passing an original material film, formed using high density polyethylene having a density of 0.935 g/cm$^3$ or more by inflation at a blow ratio of 3 or more, through at least three heating rolls under temperature conditions such that the temperature of the second from the last heating roll $R_2$ is set higher than the temperatures of the first, or third from the last, heating roll $R_1$ and the last heating roll $R_3$, and the temperature of $R_2$ is set at 105° C. or more but below the melting point of said film.

2. A film as claimed in claim 1, wherein the density of the high density polyethylene is 0.945 to 0.960 g/cm$^3$.

3. A film as claimed in claim 1, wherein the thickness of the film is 10 to 87 μm.

4. A film as claimed in claim 1, wherein the Young's modulus of the film is 7200 kg/cm$^2$ or more.

5. A film having a thickness of 10 to 200 μ comprised of 50% by weight or more of high density polyethylene having a density of 0.935 g/cm$^3$ or more and having an MFR of 0.1 g/10 min or less and high pressure low density polyethylene having a density of 0.910 to 0.930 g/cm$^3$ and having an MFR or 0.1 to 10.0 g/10 min, said high density polyethylene type film having a film surface roughness of 0.001 to 0.17 μm, a coefficient of C axis orientation of the crystals in the film (Fc) of −0.3 to +0.50, a difference Δn of the birefringence of the amorphous portions and crystalline portions in the film of 0.1000 to 0.1070, an impact strength of 230 kg·cm/mm or more and a transparency of a haze of less than 10%, said film being produced by passing an original material film, formed using high density polyethylene having a density of 0.935 g/cm$^3$ or more by inflation at a blow ratio of 3 or more, through at least three heating rolls under temperature conditions such that the temperature of the second from the last heating roll $R_2$ is set higher than the temperatures of the first, or third from the last, heating roll $R_1$ and the last heating roll $R_3$, and the temperature of $R_2$ is set at 105° C. or more but below the melting point of said film.

6. A film as claimed in claim 5, wherein the density of the high density polyetheylene is 0.945 to 0.960 g/cm$^3$.

7. A film as claimed in claim 5, wherein the thickness of the film is 10 to 87 μm.

8. A film as claimed in claim 5, wherein the Young's modulus of the film is 7200 kg/cm$^2$ or more.

9. A film having a thickness of 10 to 200 μm comprised of 50% by weight or more of high density polyethylene having a density of 0.935 g/cm$^3$ or more and having an MFR of 0.1 g/10 min or less and straight chain low density polyethylene having a density of 0.880 to 0.930 g/cm$^3$ and having an MFR or 0.1 to 10.0 g/10 min, said high density polyethylene type film having a film surface roughness of 0.001 to 0.17 μm, a coefficient of C axis orientation of the crystals in the film (Fc) of −0.3 to +0.50, a difference Δn of the birefringence of the amorphous portions and crystalline portions in the film of 0.1000 to 0.1070, an impact strength of 285 kg·cm/mm or more and a transparency of a haze of less than 10%, said film being produced by passing an original material film, formed using high density polyethylene having a density of 0.935 g/cm$^3$ or more by inflation at a blow ratio of 3 or more, through at least three heating rolls under temperature conditions such that the temperature of the second from the last heating roll $R_2$ is set higher than the temperatures of the first, or third from the last, heating roll $R_1$ and the last heating roll $R_3$, and the temperature of $R_2$ is set at 105° C. or more but below the melting point of said film.

10. A film as claimed in claim 9, wherein the density of the high density polyethylene is 0.945 to 0.960 g/cm$^3$.

11. A film as claimed in claim 9, wherein the thickness of the film is 10 to 87 μm.

12. A film as claimed in claim 9, wherein the Young's modulus of the film is 7200 kg/cm$^2$ or more.

13. A process for producing a high transparency high density polyethylene film having a haze of less than 10 comprised of the steps of passing an original material film, formed using high density polyethylene having a density of 0.935 g/cm$^3$ or more by inflation at a blow ratio of 3 or more, through at least three heating rolls under the below mentioned temperature conditions, heat treating the same under a draw ratio of 5 or less, and then cooling the same, said process for producing a high density polyethylene film being characterized in that, as to the temperature conditions of the above-mentioned heating rolls, designating the heating rolls in the order of the passage of said original material film as the first, or third from the last, heating roll (hereinafter referred to as "$R_1$"), the second from the last heating roll (hereinafter referred to as "$R_2$"), and the last heating roll (hereinafter referred to as "$R_3$"), the temperature of $R_2$ is set higher than the temperatures of $R_1$ and $R_3$ and the temperature of $R_2$ is set at 105° C. or more but below the melting point of said film.

14. A process for production according to claim 13, wherein use is made, in addition to the heating rolls, of heating by an external heating means.

* * * * *